United States Patent [19]

Sweet et al.

[11] 3,884,526

[45] May 20, 1975

[54] UNIT FOR CONVERTING FLAT-BED TRUCKS TO SIDE-DUMP TRUCKS

[75] Inventors: Phillip J. Sweet; Buck C. Hamlet; David L. Sweet, all of Fresno, Calif.

[73] Assignee: American Carrier Equipment, Fresno, Calif.

[22] Filed: July 2, 1973

[21] Appl. No.: 375,765

[52] U.S. Cl............................. 298/1 A; 298/18
[51] Int. Cl............................................ B60p 1/16
[58] Field of Search............................ 298/1 A, 18

[56] References Cited
UNITED STATES PATENTS

| | | | |
|---|---|---|---|
| 2,530,613 | 11/1950 | Hopper | 298/18 |
| 2,611,641 | 9/1952 | Stockwell | 298/18 |
| 2,640,725 | 6/1953 | Dale | 298/1 A |
| 3,019,054 | 1/1962 | Stahly | 298/18 |
| 3,655,218 | 4/1972 | Taylor | 298/18 X |

*Primary Examiner*—Robert B. Reeves
*Assistant Examiner*—David A. Scherbel
*Attorney, Agent, or Firm*—Huebner & Worrel

[57] ABSTRACT

A unit for coverting flat-bed trucks to side-dump trucks, characterized by a planar frame of a substantially unitary configuration adapted to be received upon the planar surface of the bed of a flat-bed truck, a side-dump box pivotally coupled to the frame, and an hydraulic ram pivotally supported by the frame and coupled with the side-dump box for imparting to the box pivotal rotation about an axis extending in juxtaposition with adjacent side edge portions of said frame and said box.

1 Claim, 7 Drawing Figures

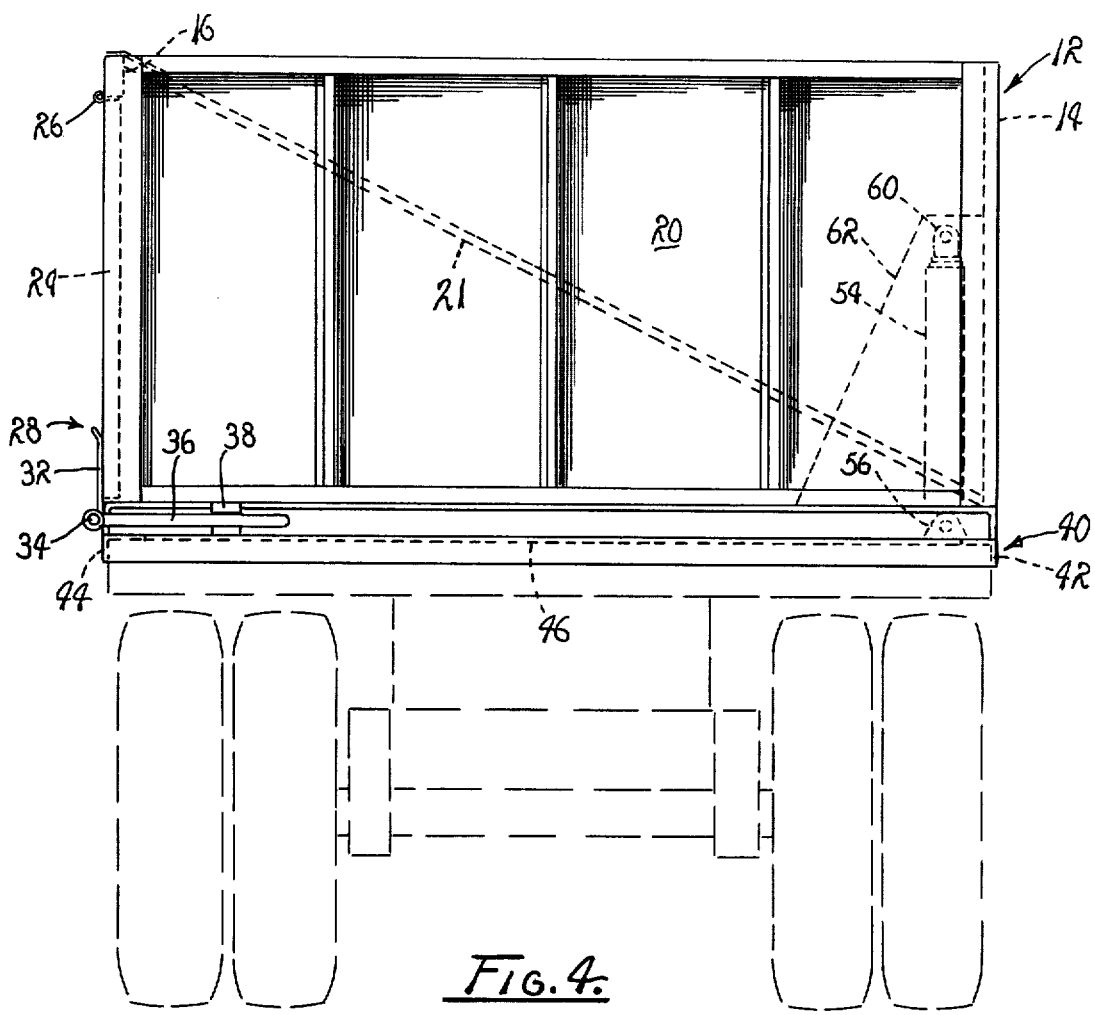
Fig. 4.
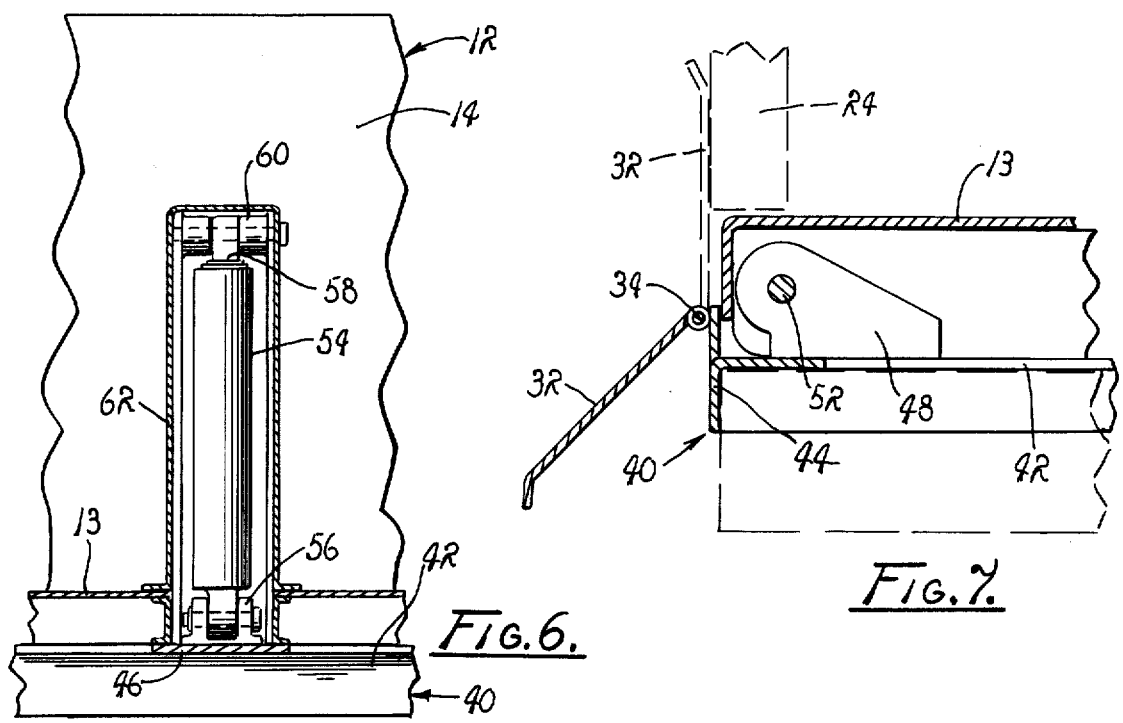
Fig. 6.
Fig. 7.

UNIT FOR CONVERTING FLAT-BED TRUCKS TO SIDE-DUMP TRUCKS

BACKGROUND OF THE INVENTION

The invention generally relates to conversion units for trucks, trailers and the like and more specifically to a unit particularly suited for expeditiously converting flat-bed trucks to side-dump trucks, whereby utility of flat-bed trucks is greatly enhanced.

The prior art, of course, is replete with dump boxes including boxes of the type commonly employed by so-called side-dump trucks. For reasons fully understood by those familiar with the trucking art, side-dump boxes are particularly suited for use in transporting bulk products, particularly agricultural products, such as grapes, oranges, beets and the like. Of course, the use of side-dump boxes in harvesting and transporting agricultural products is of a substantially seasonal nature. Consequently, it has been common practice to mount side-dump boxes on the chasses of trucks and thereafter replace the boxes with beds of another type, such as flat-beds, preparatory to transporting materials not suited for hauling in side-dump boxes.

As can readily be appreciated, by those familiar with the outfitting, rigging, and otherwise modifying truck beds, a substantial amount of time is wasted in converting a flat-bed to a side-dump box, or the reverse of such conversion.

It is therefore the purpose of the instant invention to provide a practical and economic unit which can readily be employed in expeditiously converting flat-beds to side-dump boxes, as well as the reverse thereof, in an economic, practical and facile manner.

OBJECTS AND SUMMARY OF THE INVENTION

It is therefore an object of the instant invention to provide a practical and economic unit for facilitating a conversion of flat-bed trucks to side-dump trucks.

It is another object to provide a portable unit for use in converting flat-bed trucks to side-dump trucks.

It is another object to provide a portable unit of an economic and practical construction particularly adapted to be supported, as an integral unit, by the surface of a flat-bed, for converting the flat-bed to a side-dump box.

It is another object to provide a removable unit for use in economically converting flat-bed trucks to side-dump trucks.

These and other objects and advantages are achieved through the use of a removable, integral unit including a planar frame configured to be received and supported by the bed of a flat-bed truck, a side-dump box pivotally coupled to the frame along one edge surface thereof, and an hydraulic ram coupled to both the frame and the side-dump box, in spaced relation to said one side edge surface, for pivotally rotating the side-dump box to a contents-discharge disposition.

BRIEF DESCRIPTION OF THE DRAWINGS

FIG. 4 is an end elevational view, on somewhat of an enlarged scale, of the unit depicted in FIG. 1;

FIG. 6 is a fragmented side view of the unit; and

FIG. 7 is a fragmented, partially sectioned view of a hinge member employed in coupling the side-dump box with its supporting frame.

DESCRIPTION OF THE PREFERRED EMBODIMENT

Figure 1:
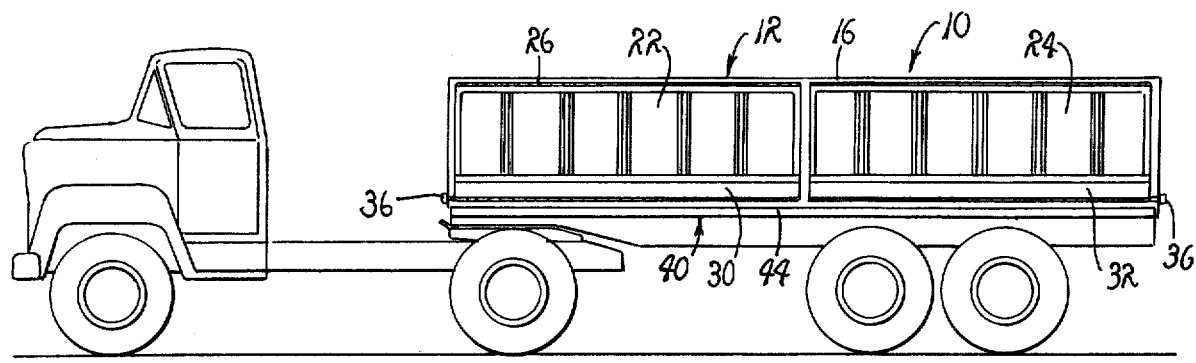
FIG. 1 is a pictorial view of a removable unit, which embodies the principles of the instant invention, mounted aboard a flat-bed truck.

Referring now to the drawings wherein like reference characters designate like or corresponding parts throughout the several views, there is shown in FIG. 1, a unit, generally designated 10, which embodies the principles of the instant invention. As illustrated, in FIG. 1, the unit 10 is supported in its operative configuration by the bed of a flat-bed truck, not designated.

The unit 10 includes a side-dump box 12 having a floor 13 of a substantially rectangular configuration, a first side wall 14 and a second side wall 16 arranged in mutually spaced parallelism and extending upwardly from the plane of the floor 13. The box 12 also is provided, at its leading end, with a first end wall 18 and with a second end wall 20, located at its trailing end. Thus, the box 12, as illustrated, is an open-top, five sided box of a configuration substantially conforming to that of a so-called side-dump box. In order to enhance stability, the box 12 is provided with a diagonal tension member 21 which extends between and is secured to the floor 13 and the upper surface of wall 16.

In order for the box 12 to function as a side-dump box, the wall 16 is provided with a pair of discharge openings, not designated, defined in the wall 16 for facilitating dumping operations whereby materials deposited within the box for hauling may be discharged therefrom. These openings are, in turn, closed by a first and second door, designated 22 and 24, respectively.

As a practical matter, each of the doors 22 and 24 is pivotally coupled to the wall 16 through an elongated hinge 26. The hinge 26, for each of the doors 22 and 24, is supported by the wall 16, immediately above an opening so that each of the doors is pivotally supported along its top edge portions for rotation above an axis extending in fore-and-aft directions, relative to the dump box.

Figure 2:
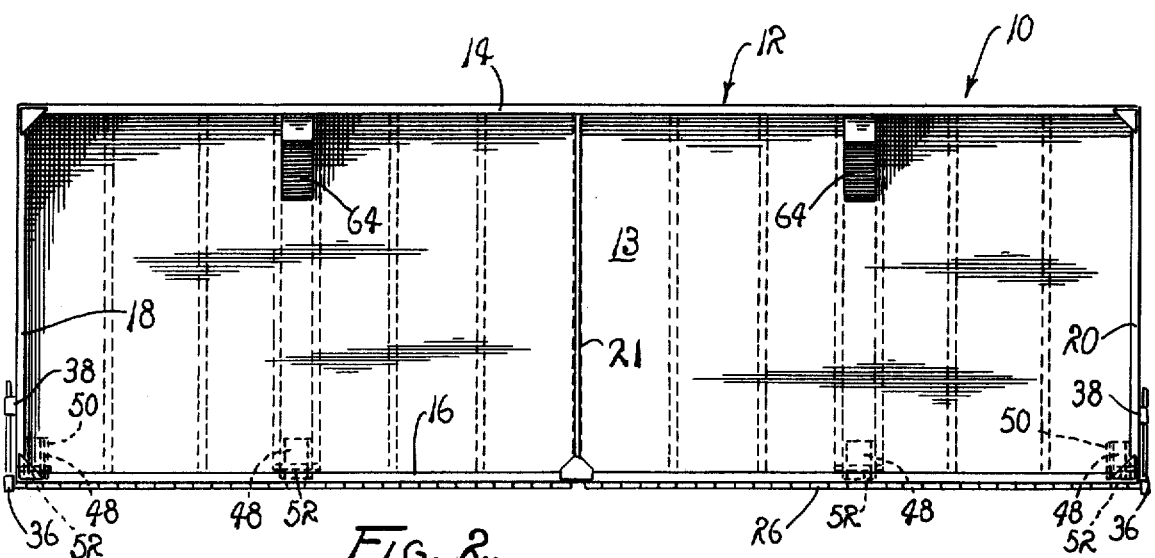
FIG. 2 is a top plan view of the removable unit depicted in FIG. 1.
Figure 3:
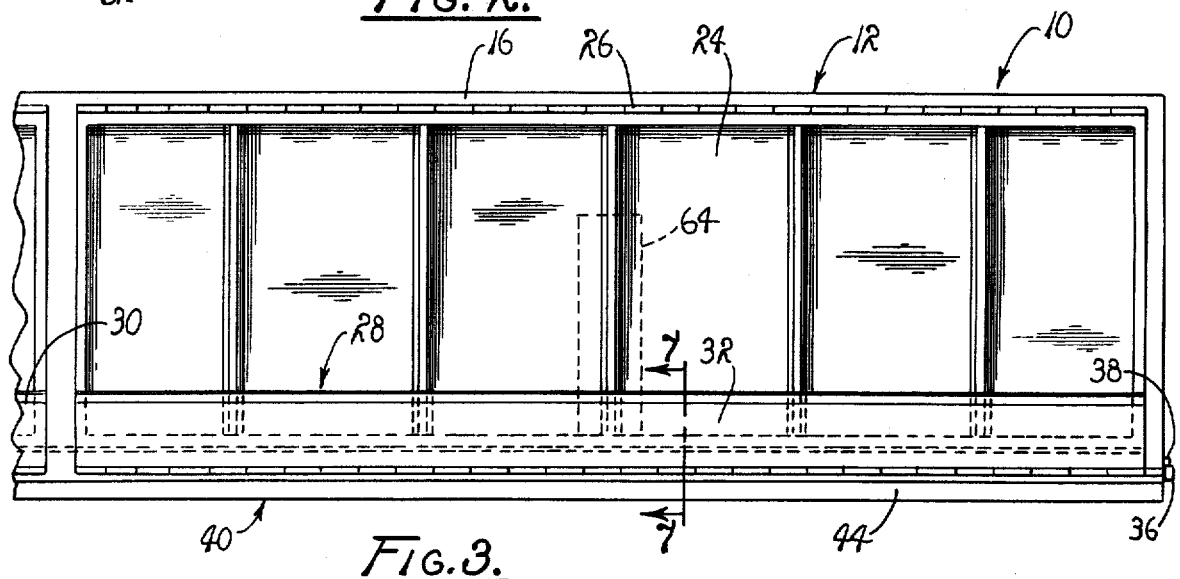
FIG. 3 is a fragmented side elevational view, on somewhat of an enlarged scale, of a portion of the unit shown in FIGS. 1 and 2.

In order to retain the doors 22 and 24 in a closed condition, relative to their respective openings, there is provided a manually operable latch, generally designated 28. The latch 28 includes a pair of latch-plates, designated 30 and 32. These plates engage and restrain the doors 22 and 24, respectively, against pivotal rotation about the axes of the hinges 26. Each of the latch-plates is rigidly fixed to an elongated hinge pin 34 supported for pivotal rotation, by suitable eyes not designated, and terminating in a handle 36. It will, therefore, be appreciated that rotation of each of the latch plates can readily be achieved simply by manipulating the appropriate handle 36 in a cranking fashion. As a practical matter, retainers 38, FIGS. 2 and 4, are provided for engaging and securing the handles 36 against undesired motion so that the latch 28 is, in effect, secured in place relative to the doors 22 and 24 for supporting the doors in a closed condition.

Figure 5:
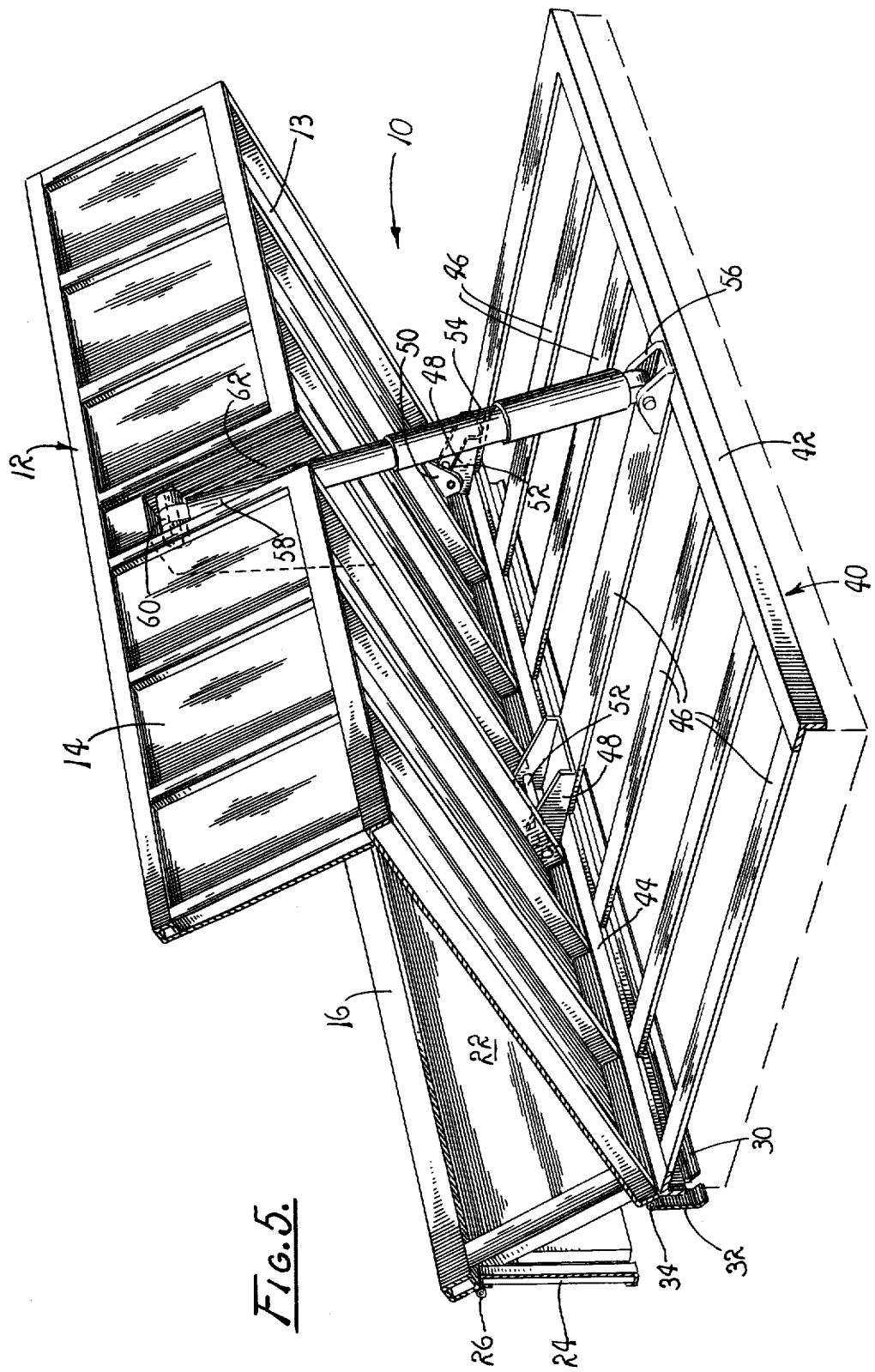
FIG. 5 is a sectioned perspective view of the unit, depicting the dump box shown in FIGS. 1 through 4, elevated with respect to its supporting frame and supported in a contents-discharge disposition.

The dump box 12 is supported by a frame 40, best illustrated in FIG. 5, configured to be received by the planar surface of the bed, not designatd, of a flat-bed truck. The frame 40 preferably includes a pair of stringers, designated 42 and 44, extending in mutually spaced parallelism through a distance substantially equal to the overall length of the box 12, as well as the overall length of the flat-bed by which it is received. As a practical matter, the stringers 42 and 44, where desired, are formed from structural extrusions of a right-angle configuration, and are so disposed as to have one component thereof depending vertically and an intersecting component extended horizontally, as best illustrated in FIG. 5. Thus, when employed, the bed of a flat-bed truck is received between depending components, while the upper surface thereof engages the intersecting component. It will, of course, be appreciated that transverse end plates, not designated, of a configuration similar to that of the stringers 42 and 44, are employed in coupling the stringers at their opposite ends so that the frame 40 is secured in an operative position thereby when mounted aboard a flat-bed truck. Moreover, where desired, the stringers 42 and 44 are provided with suitable anchor lugs for anchoring the frame 40 on its supporting flat-bed. Also provided is a plurality of transverse supports 46 which extend between the stringers for lending rigidity to the frame 40.

The box 12 preferably is coupled with the frame 40 by a plurality of clevis couplings 48 welded to the frame 40 at suitable locations. It is important here to note that the clevis couplings 48 are welded to the frame 40 in mutual alignment along the edge of the frame, immediately beneath the openings provided in the wall 16 of the box 12. As best illustrated in FIG. 5, the clevis couplings 48 are, where desired, mated with brackets 50 of a similar configuration, affixed to the lowermost portion of the box 12. A plurality of pins 52 is extended through clevis couplings 48 and unites the couplings with the box 12. Therefore, it should readily be apparent that pivotal rotation of the box 12 relative to the frame 40 is facilitated. Thus a dumping of the side box readily can be effected simply by elevating the box 12 at the side thereof opposite the clevis couplings 48 for pivotally rotating the box about the axes of the pins 52.

The box 12 is elevated through the use of a pair of hydraulic rams 54, each of which is pinned to the frame 40 through a bracket 56 welded or otherwise rigidly secured to the frame adjacent the stringer 42. Of course, where preferred, the rams 54 are pneumatically operated, however, it has been found that hydraulic rams function quite satisfactorily for this purpose. The rams 54, as a practical matter, include multiple telescoping sections terminating in axially extensible output shafts 58. Since these rams are commercially available, a detailed description thereof is omitted in the interest of brevity. The distal ends of the shafts 58 are pinned to suitable couplings 60 provided within the wall 14 of the box 12 while enclosures 62 are formed therein for isolating the rams 54 from contents deposited within the box.

In view of the foregoing, it should be apparent that through the unit 10 of the instant invention there has been provided a simple, economic and practical device for converting flat-bed trucks to side-dump trucks.

OPERATION

It is believed that in view of the foregoing description, the operation of the device will readily be understood and it will be briefly reviewed at this point.

The unit 10, assembled in the manner hereinbefore described, readily can be hoisted aboard a flat-bed truck and placed in an operative position employing simple hoisting equipment including cherry-pickers, cranes, fork-lifts, and the like. In any event, the unit 10 is lowered into supported engagement with the uppermost surface of the bed of a flat-bed truck. The unit 10 is then secured to the bed in any suitable manner including coupling mechanisms, such as lugs and the like. Thereafter, the rams 54 are connected with a suitable source of fluid under pressure, including either pneumatic or hydraulic fluid as is appropriate. Thus, a flat-bed truck is expeditiously, effectively and economically converted to a side-dump truck, without destroying thr original characteristics of the bed of the truck.

In use, the doors 22 and 24 are secured in a closing relationship with respect to openings provided in the wall 16 of the box 12. In order to discharge the load, the handles 36 are released from the retainers 38 and manually rotated for disengaging the latch-plates 30 and 32, relative to the doors 22 and 24. The rams 54 are now charged so that their output shafts 58 are axially extended for elevating the box 12, at one side thereof, whereupon the unit 10 functions as a side-dump truck, in a known manner.

Of course, upon a removal of pressurized fluid from the rams 54, the box 12 is lowered into a seated relationship with the frame 40. Thereafter, the doors 22 and 24 are again secured by rotating the latch-plates 30 and 32 into a securing relationship relative to the doors.

In the event removal of the unit 10 from the flat-bed truck is desired, it is simply necessary to release the coupling mechanisms provided and employed for securing the frame 40 to the bed, and thereafter remove the unit 10, including the frame 40, the box 12 and the rams 54, as an integrated unit from the bed of the truck with which the unit has been associated. Thus the truck is reconverted to its initial flat-bed configuration with minimal effort and expense.

In view of the foregoing, it should be apparent that the unit 10 of the instant invention provides a practical solution for the perplexing problem of converting flat-bed trucks to side-dump trucks.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. A side-dump unit for converting a flat-bed truck to a side-dump truck, comprising:
   A. a rectangular frame of substantially planar configuration having a length and a width substantially equal to the length and the width of a flat-bed mounted on the chassis of a selected flat-bed truck and adapted to be received upon the uppermost planar surface of the flat-bed, including,
      1. a pair of stringers disposed in mutual parallelism having a length substantially equal to the length of said flat-bed and spaced apart a distance substantially equal to the width thereof, and 2. a plurality of transverse members extended in mutual parallelism between said stringers and connected thereto;
B. a side-dump box having a length and a width substantially equal to the length and the width of said frame seated on said frame in a superimposed relationship therewith, including,
   1. a pair of side walls having a length substantially equal to the length of said frame and disposed in planes arranged in mutual parallelism and spaced apart a distance substantially equal to the width of said frame, and
   2. a pair of transversely oriented end walls extended in mutual parallelism between said side walls and connected thereto;
C. means defining in one side wall of said pair a normally closed, discharge opening for said side-dump box;
D. means including an enclosure member having a substantially U-shaped cross-sectional configuration defining within the other side wall of said pair of side walls a recess extended inwardly and opened outwardly with respect to said side-dump box;
E. hinge means adjacently related to said one side wall and affixed to said frame in juxtaposition with one stringer of said pair for pivotally connecting said side-dump box to said frame for oscillation about an axis extended in substantially juxtaposed parallelism with said one stringer;
F. means including a pressure-responsive ram positioned above the plane of said frame for imparting oscillatory motion to said side-dump box including a base end disposed adjacent to said frame and a distal end disposed within said recess; and
G. mounting means for pivotally interconnecting said ram between said frame and said side-dump box including a bracket pivotally connected to the base end of said ram and affixed to the frame above the plane thereof in juxtaposition with the other stringer of said pair, and coupling means disposed within said recess for pivotally connecting the distal end of said ram to said enclosure member.

* * * * *